United States Patent [19]

Wiatt et al.

[11] 4,432,720

[45] Feb. 21, 1984

[54] APPARATUS FOR HIGH RATE PRODUCTION OF BIAXIALLY ORIENTED THERMOPLASTIC ARTICLES

[75] Inventors: James G. Wiatt; James W. Calvert; Samuel L. Belcher, all of Cincinnati; Roger D. Smith, Bethel, all of Ohio

[73] Assignee: Cincinnati Milacron Inc., Cincinnati, Ohio

[21] Appl. No.: 460,830

[22] Filed: Jan. 25, 1983

Related U.S. Application Data

[62] Division of Ser. No. 257,468, Apr. 24, 1981, Pat. No. 4,382,760.

[51] Int. Cl.³ .......................................... B29C 17/07
[52] U.S. Cl. .................................. 425/534; 425/535; 425/538; 425/541
[58] Field of Search ............... 425/525, 526, 534, 535, 425/529, 538, 541; 264/523, 535

[56] References Cited

U.S. PATENT DOCUMENTS

| | | |
|---|---|---|
| 2,975,473 | 3/1961 | Hagen et al. . |
| 3,149,373 | 9/1964 | Marzillier . |
| 3,364,520 | 1/1968 | Hestehave . |
| 3,415,915 | 12/1968 | Lecluyse et al. . |
| 3,502,758 | 3/1970 | Plummer . |
| 3,579,725 | 5/1971 | Hansen et al. ............... 425/534 X |
| 3,669,601 | 6/1972 | Lainesse . |
| 3,729,283 | 4/1973 | Eggenberger et al. . |
| 4,116,325 | 9/1978 | McDonald . |
| 4,140,464 | 2/1979 | Sporr et al. . |
| 4,197,073 | 4/1980 | Rees et al. ............... 425/534 X |
| 4,354,813 | 10/1982 | Collombin ............... 425/526 X |
| 4,365,950 | 12/1982 | Harry et al. ............... 425/534 |

Primary Examiner—Jan H. Silbaugh
Attorney, Agent, or Firm—John W. Gregg; Daniel P. Worth

[57] ABSTRACT

A machine for high rate production of molecularly oriented thermoplastic bottles is disclosed. The machine is of the reheat-and-blow type. A blow molding station simultaneously blow molds article preforms arranged in matrices by modular article carriers for conveying the preforms and articles through the machine. The carriers are designed to retain the preforms throughout all operations of the machine from a preform load station through a thermal conditioning section, a blow molding station, and to a bottle eject station, thereby eliminating the need for other preform transferring apparatus. The article carriers together with the associated conveying apparatus comprise a sufficiently flexible structure that minor misalignments of the carriers with the blow molding mechanism do not adversely affect bottle production. Both loading of preforms and ejection of finished bottles are accomplished by operation upon matrices of preforms and bottles as defined by the carriers and conveyor lanes.

5 Claims, 14 Drawing Figures

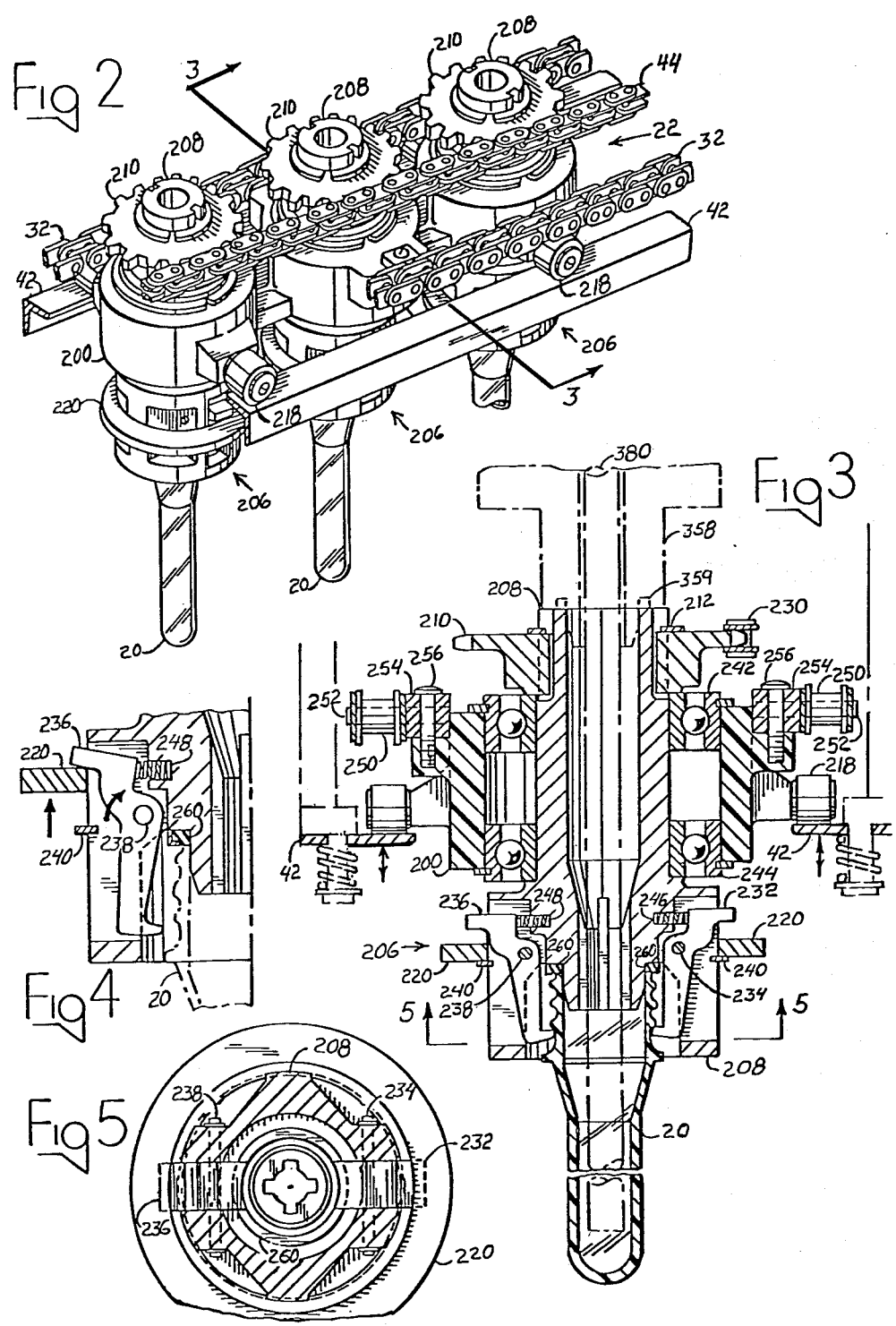

APPARATUS FOR HIGH RATE PRODUCTION OF BIAXIALLY ORIENTED THERMOPLASTIC ARTICLES

This is a division of application Ser. No. 257,468, filed Apr. 24, 1981, now U.S. Pat. No. 3,382,760.

BACKGROUND OF THE INVENTION

This invention relates generally to the production of biaxially oriented thermoplastic containers used primarily by beverage bottlers. In particular the present invention relates to the high rate production of such articles from injection molded article preforms.

Biaxially oriented thermoplastic beverage bottles are produced primarily on two types of equipment. The first of these, an integrated machine, combines the preform producing injection molding operation with the bottle producing blow molding operation. Generally, such equipment includes a thermal conditioning apparatus between the injection and blow molding stations to adjust the temperature of the thermoplastic material to a level suitable for blow molding. This thermal conditioning apparatus may perform cooling and reheating of the newly created preforms. Typically, this type of equipment conveys the preforms from the injection molding station throughout the remaining operating stations by clamping and molding apparatus that forms the capping portion of the finished bottle. Consequently, the preform carrying apparatus must be capable of precise positioning and must be sufficiently rigid to permit both injection and blow molding operations.

The second type of equipment operates upon premanufactured preforms and includes apparatus for reheating the preforms to a suitable temperature for molecular orientation during blow molding and further includes apparatus for blow molding. This type of equipment is known as reheat-and-blow machinery. In this type of equipment, the preforms are transferred from carriers to mold sections prior to blowing, a step which requires additional article handling equipment as compared to the integrated type of equipment.

In both types of equipment, a set of bottles is blow molded by closure of a single set of mold sections to surround, at most, one row of preforms. Mold closing actuators operate individually on the mold sections comprising the set, and clamping forces required to overcome the bottle expansion forces are distributed among these actuators. Consequently, the production rate of bottles is limited by the number that can be simultaneously produced by equipment operating on single rows of articles. Because increases in the density of the rows is limited by the bottle size and process forces, higher production rates require lengthening of the rows with the attendant increase in machine volume.

It is therefore one object of the present invention to provide a blow molding means which can simultaneously operate on more than one set of mold sections.

It is a further object of the present invention to minimize the volume required by molding means simultaneously operating on more than one set of mold sections.

It is a further object of the present invention to provide a molding means which can receive and operate on article preforms which are retained by modular carriers which are not susceptible to requirements of precise alignment with molding equipment.

SUMMARY OF THE INVENTION

A machine is disclosed of the reheat-and-blow type of equipment which thermally conditions previously produced preforms and blow molds the thermally conditioned preforms in matrices, thereby yielding a high rate of production while minimizing the overall machine volume. Further, article conveying means are disclosed which eliminate the need for transfer of articles from carriers to mold sections for blowing, thus reducing the quantity of article handling equipment otherwise required.

In one embodiment of the present invention, to be described more fully hereinafter, an apparatus is disclosed having a preform load station, a thermal conditioning section, a blow molding station and an eject station. These stations are all serviced by article carriers conveyed through closed paths defined by guide ways and conveyor chains which support the carriers. The closed paths further define lanes parallel to the long axis of the machine frame and within which columns of articles are conveyed, the columns being defined by the article carriers. Rows of articles are defined by the alignment of carriers within adjacent lanes, and the rows and columns together define matrices of articles and preforms.

The mold sections at the blow molding station operate on a matrix of articles. A matrix of articles at the blow molding station being described by the rows as defined by the lanes and by the columns as defined by the carriers. Mold clamping forces generated by actuators acting on push rods are distributed in equal amounts at each mold section. Consequently, only two actuators are used to open and close a plurality of molds. The mold sections and push rods or mold guide rods operate in sets.

The carriers provide means for rotation of preforms being passed through the thermal conditioning section. Further, means are provided to permit barrel expansion of the preforms at the mold station while the preforms are retained by the same carriers into which they are placed at the load station.

The carriers are returned to the load station after removal of finished bottles at the eject station by movement through the closed paths defined by the carrier conveyor.

BRIEF DESCRIPTION OF THE DRAWINGS

FIG. 2 is an isometric view of an article carrier.

FIG. 3 is a sectional view taken along section lines 3—3 of FIG. 2 showing the article gripper levers or fingers of the carrier chuck in a closed position.

FIG. 4 is a partial section of the carrier showing the fingers in an open position.

FIG. 5 is a sectional view through the bottom of a carrier chuck taken along lines 5—5 of FIG. 3.

DESCRIPTION OF THE PREFERRED EMBODIMENT

For purposes of illustrating the invention, a machine for the production of biaxially oriented polyethylene terephthalate beverage bottles shall be described in more detail. Such a machine is manufactured by Cincinnati Milacron Inc., the assignee of the present invention, and this machine constitutes a preferred embodiment. This machine, illustrated schematically in FIG. 1, accepts beverage bottle preforms such as those illustrated in FIGS. 2, 3 and 6 and produces finished beverage bottles such as those illustrated in FIGS. 12, 13 and 14. It will be appreciated that each preform has a formable portion which is to be biaxially expanded and a neck portion, shown threaded for capping, which is not to be deformed.

Overall Machine

Figure 1:
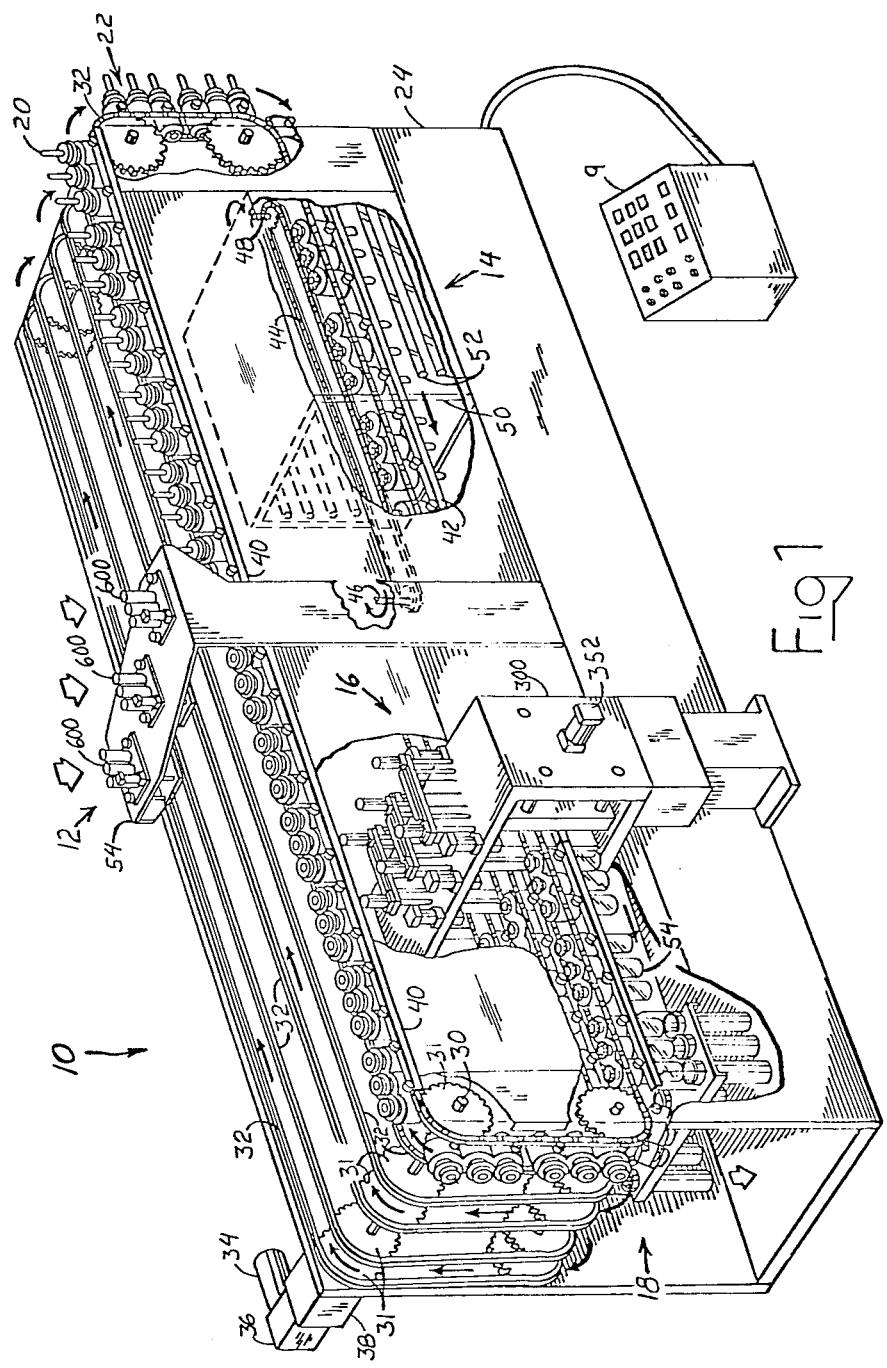
FIG. 1 is an isometric view of the overall blow molding machine.

Referring now to FIG. 1, beverage bottle preforms 20 enter machine 10 at load station 12. These preforms are conveyed by carriers 22 through a thermal conditioning section 14 where the temperature of the thermoplastic material is heated to the molecular orientation temperature necessary for achieving the desired vapor barrier properties as well as clarity and strength of the finished bottles. From the thermal conditioning section 14 or oven, the carriers are advanced to the blow molding station 16 where the thermally conditioned preforms are expanded by injection of pressurized air while the preforms are retained within closed mold cavities defining the final bottle shape. From the mold station, the carriers are advanced to the eject station 18 where the finished bottles are released for collection at the machine base. From the eject station 18 the empty carriers 22 are further advanced to return to the load station 12.

At the blow mold station 16, the mold clamp mechanism 300 is rigidly affixed to the machine frame 24. There being no motion of the blow station with respect to the machine frame 24, the motion of carriers 22 around the closed path from and to load station 12 must be intermittent. To accomplish this intermittent motion, a drive mechanism is used consisting of a motor 34, a speed reducer 36 and an indexing mechanism 38 of the type commercially available. Indexing mechanism 38 rotates shaft 30 upon which are mounted sprockets 31 for driving conveyor chains 32. Each carrier 22 is supported by a pair of conveyor chains 32 so that the three pairs of chains 32 define three pairs of closed paths further defining three lanes for the operating stations. Over the length of machine 10 the carriers 22 are supported by pairs of upper guideways 40 and lower guideways 42 thereby limiting the load forces on the conveyor chains 32. At load station 12, the preform loader mechanisms 600 are supported above the lanes by frame 54 attached to base 24.

At oven 14, preforms 22 are passed through partial enclosures or tunnels defined by frame 50 within which the ambient temperature is controlled. Each lane has an associated oven tunnel and an associated system of air ducts, blowers and dampers for exhausting heated air and admitting room temperature air. Within these partial enclosures preforms 22 are exposed to radiant heat from heating elements 52 while simultaneously being rotated. Rotation of the preforms 20 while in carriers 22 is imparted via chain 44 which is continuously driven by sprocket and shaft assemblies 48 and 46.

Carrier

In FIG. 2 a carrier 22 is shown supported by lower guideways 42 and engaged with conveyor chains 32 as well as rotation chain 44 as the carrier would appear when located within the thermal conditioning section.

Within each carrier 22 three cylindrical chucks 208 are rotatably supported by carrier body 200. A sprocket 210 is attached to one end of each chuck 208 for engaging the rotation chain 44. The opposite end of chuck 208 supports the article gripping assembly indicated generally as 206. In the preferred embodiment, each carrier body 200 is fabricated as a single molded piece as is each chuck 208. Carrier 22 is supported on guideways 42 by rollers 218 attached to carrier body 200.

In the section of FIG. 3, taken along line 3—3 of FIG. 2, it is seen that chuck 208 is rotatably supported in carrier body 200 by upper bearing 262 and lower bearing 244. In FIG. 3, the air injection nozzle 358 together with sealing ring 359 and centering rod 380, all of which are part of the blow molding station apparatus, are shown in phantom. Also shown in phantom are the spring supports for the sections of guide ways 42 associated with the blow molding station. These items shall be discussed in greater detail subsequently, however, they serve to illustrate that a passage is provided through the center of chuck 208 to preform 20 for injection of the pressurized expansion air.

Continuing with reference to FIG. 3, projections or keys of sprocket 210 are shown to be engaged with slots in chuck 208, the sprocket 210 being held in place upon chuck 208 by retaining ring 212. Engagement of sprocket 210 with the rotation chain 44 of the thermal conditioning section is illustrated by the section through link 230. Carrier body 200 is connected to conveyor chains by link pin blocks 254 which are attached to carrier body 200 by screws 256. Link pin blocks 254 receive link pins 252, shown in phantom, of links 250 of conveyor chains 32.

Continuing with reference to FIG. 3, gripper assembly 206 is shown engaging the neck or capping portion of preform 20. Release ring 220 is shown in its rest position upon retaining ring 240. Opposing levers 232 and 236 on pivot pins 234 and 238, respectively, are shown held in tension against preform 20 by biasing springs 246 and 248. Preform 20 is shown holding resilient sealing ring 260 in compression against the inside surface of the chuck body. The gripper assembly 206 is seen to perform the function of producing a pressure resistant seal between the chuck 208 and the preform 20 by virtue of the manner in which the levers 232 and 236 engage the capping portion of the preform 20 applying a component of force parallel to the longitudinal axis of the preform and in the direction toward the carrier. Additionally, the lower chuck body which comprise the shell of the gripper assembly provides a shield for the neck portion of preform 20 to prevent it from being heated to a formable temperature when the carrier is conveyed through the oven. Thus, at the blow station only the formable portion of the preform will be expanded by the blow pressure.

In the partial section of FIG. 4, release ring 220 is shown raised to the release position causing rotation of lever 236 about pivot pin 238. Spring 248 is shown compressed while lever 236 is disengaged from preform 20, shown in phantom, which is relieved from resilient seal 260. In a like manner lever 232 is also rotated away from preform 20 by the release ring 220. Thus, by movement of the release ring parallel to the longitudinal centerline of the chuck, the gripper may be forced to an article release condition and allowed to return to an article retention condition. It is apparent from this that the operation of the levers 232 and 236 can be effected without regard for the orientation of the chuck 208 within the carrier 200 so long as the release ring is displaced parallel to the longitudinal axis of the chuck without cocking.

Referring to the partial section of FIG. 5 taken along line 5—5 of FIG. 3 through chuck 208, the cavity for reception of the threaded or capping portion of preform 20 is revealed. Additionally, the splined support for centering rod 380 through the center of chuck 208 is also shown, further revealing the details of the passage through the chuck that admits the pressurized expansion air into the preform.

Loader Mechanism

Figure 6:
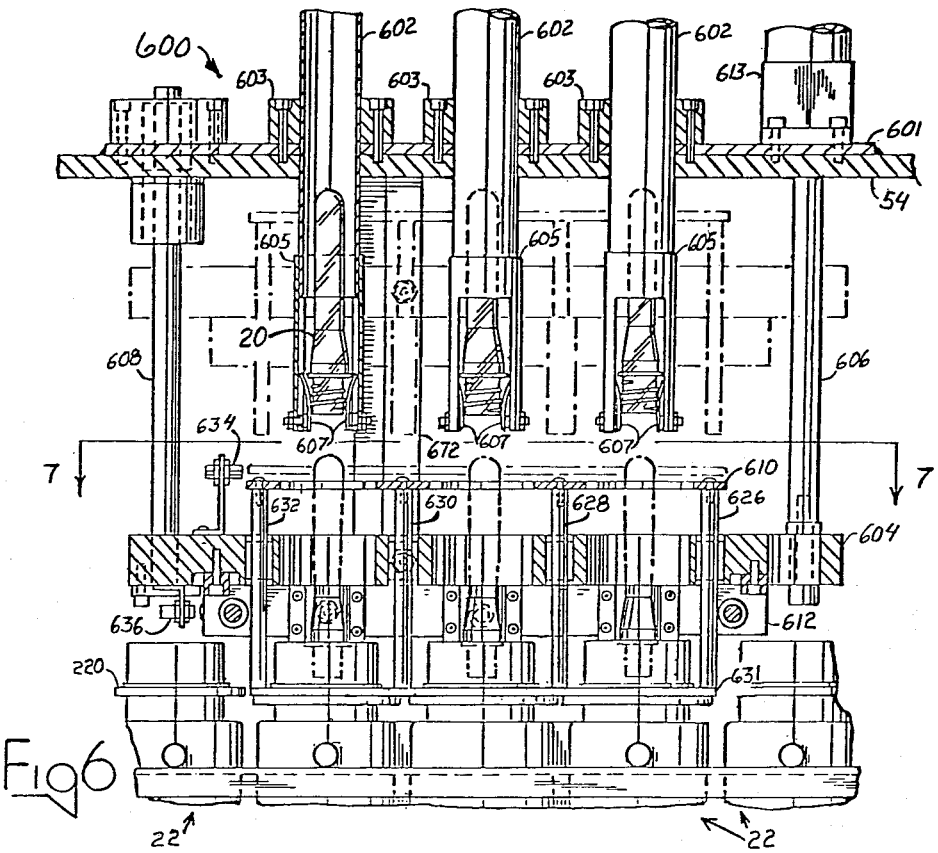
FIG. 6 is a side view of the article load station mechanism.
Figure 7:
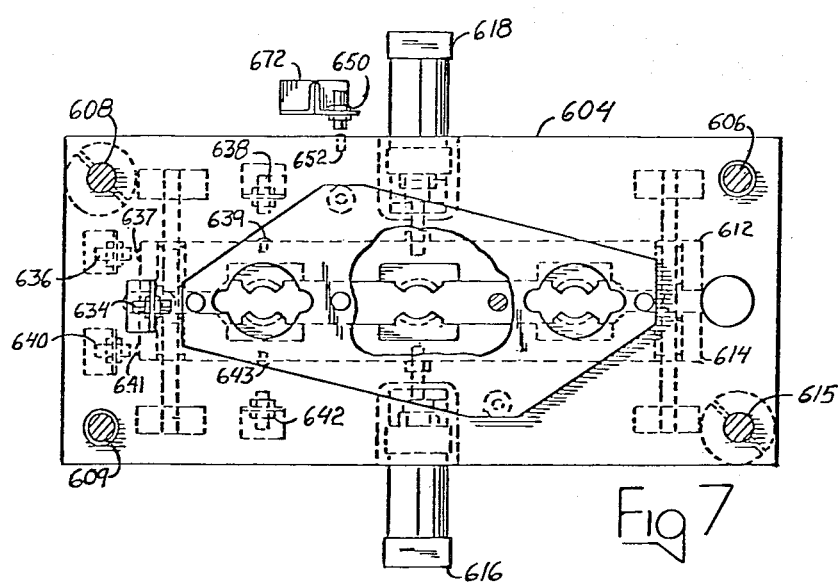
FIG. 7 is a sectional view taken along line 7—7 of FIG. 6.
Figure 8:
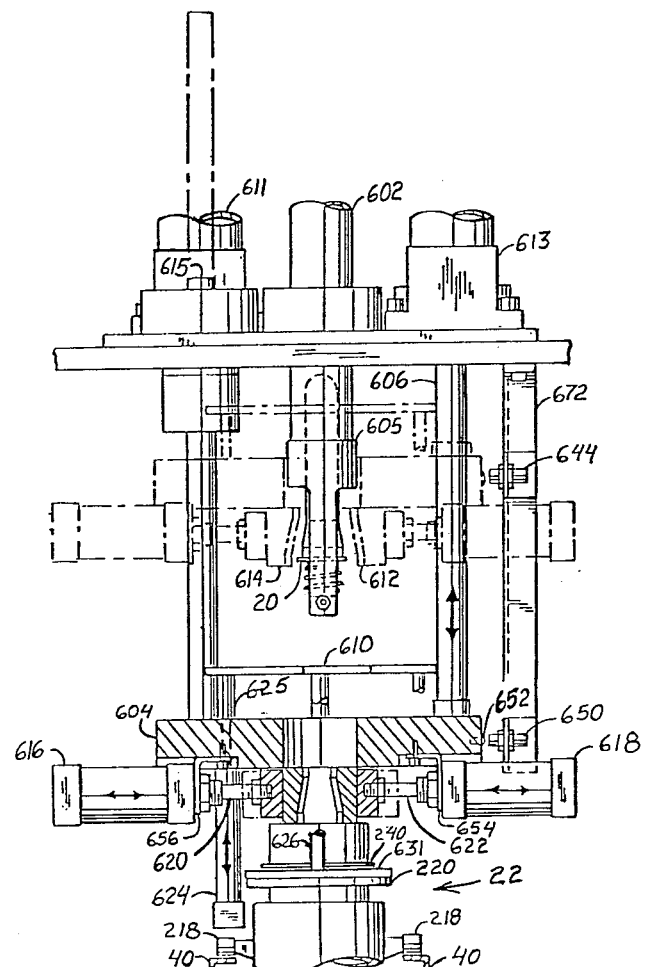
FIG. 8 is an end view of the load station mechanism.

The loader mechanism 600 of load station 12 and its cooperation with carriers 22 is depicted in FIGS. 6 and 8. FIG. 7 shows the layout of the loader mechanism assembly taken along line 7—7 of FIG. 6.

FIG. 6 is a side view of the loader mechanism assembly 600 with liberal use of partial sections and cross-sections to show details thereof. Preform transfer plate 604 is shown in phantom lines in the preform receiving position and in solid and section lines in the carrier load position. Preforms 20 enter the machine load station 12 through loading tubes 602. Attached to the lower end of these tubes are preform staging sleeves 605 which serve to releasably hold preforms 20 in position by means of retaining springs 607 contacting the neck portions of the preforms. Loading tubes 602 are attached to the load station mounting frame 54 by collars 603 which seat against mounting plate 601.

Preforms 20 are removed from staging sleeves and inserted in carriers 22 by transfer plate 604 and preform grasping jaws 612 and 614. Transfer plate 604 is raised and lowered by means of actuators 611 and 613 with push rods 606 and 609 and guide rods 608 and 615. Staging sleeves 605 are provided with side openings to receive preform grasping jaws 612 and 614. In the end view of load mechanism 600 of FIG. 8, grasping jaws 614 and 612 are shown in the open position at the preform receiving position in phantom lines.

Means for operating release rings 220 of carriers 22 are mounted upon transfer plate 604. In order to load preforms 20 into gripper assemblies 206 of chucks 208 it is necessary to rotate levers 236 and 232 shown in FIGS. 3 and 4 to the release position. Referring now to FIG. 6, release drive pin plate 610 is advanced from the position shown in phantom to the position shown in solid and section lines in order to advance release rings 220 and thereby to force the grippers into the article release condition. Drive pins 626, 628, 630 and 632 are positioned between drive pin plate 610 and release ring contact plate 631. Referring to FIG. 8, actuator 624 and push rods 625 for driving release ring drive pin plate 610 are shown in the end view.

Continuing with reference to FIG. 8, grasping jaws 612 and 614 are shown in partial section together with their respective actuators 616 and 618 which are mounted to transfer plate 604 by brackets 654 and 656. Push rods 622 and 620 of actuators 616 and 618, respectively, serve to advance and retract jaws 612 and 614 between open and closed positions. The outline of jaws 612 and 614 are shown as dashed lines in FIG. 7.

Reference will now be made to FIGS. 6, 7 and 8 to describe the sequence of operation of the loader mechanism 600. It is assumed that preforms 20 are in staging sleeves 605 and that transfer plate 604 is at the receiving position shown in phantom in FIG. 6. The position of transfer plate 604 is monitored by proximity sensor 644 of FIG. 8 together with activating button 652. Under these assumptions, the actuators 616 and 618 can be energized to advance grasping jaws 612 and 614 to close around formable portions of preforms 20. Closed position of jaw 612 is detected by proximity sensor 636 in combination with activating button 637 and closed position of jaw 614 in combination with activating button 637 and closed position of jaw 614 is detected by proximity detector 640 in combination with activating button 641. With the grasping jaws closed around preforms 20, actuators 611 and 613 can be energized to advance transfer plate 604 to the carrier load position. Simultaneously, the drive pin plate 610 may be advanced to the release ring activating position by its actuator 624. Movement of drive pin plate 610 away from the rest position is detected by proximity switch 634. Presence of transfer plate 604 at the carrier load position is detected by proximity switch 650 of FIG. 8 in combination with activating button 652. When transfer plate 604 has arrived at the carrier load position, the drive pin plate 610 can be returned to the rest position detected by proximity swtich 634 permitting levers 232 and 236 of grippers 206 to close thus allowing grippers 206 to return to the article retention condition and retain preforms in chucks 208. Once the position of drive pin plate 610 has been detected at the rest position when transfer plate 604 is at the carrier load position, actuators 616 and 618 may be energized to retract the grasping jaws 612 and 614. Presence of jaw 612 at the fully retracted position is detected by proximity switch 638 in combination with activating button 639. Similarly, location of jaw 614 at the retract position is detected by proximity switch 642 in combination with activating button 643. When jaws 614 and 612 have been retracted to their rest positions as indicated by proximity switches 638 and 642, actuators 613 and 611 can be once again energized to retract transfer plate 604 to the preform receiving position. It will be appreciated that with each index of conveyor chains 32, the entire sequence of operation of load mechanism 600 must be repeated as empty carriers 22 are advanced to load station 12.

Blow Mold Station

Figure 9:
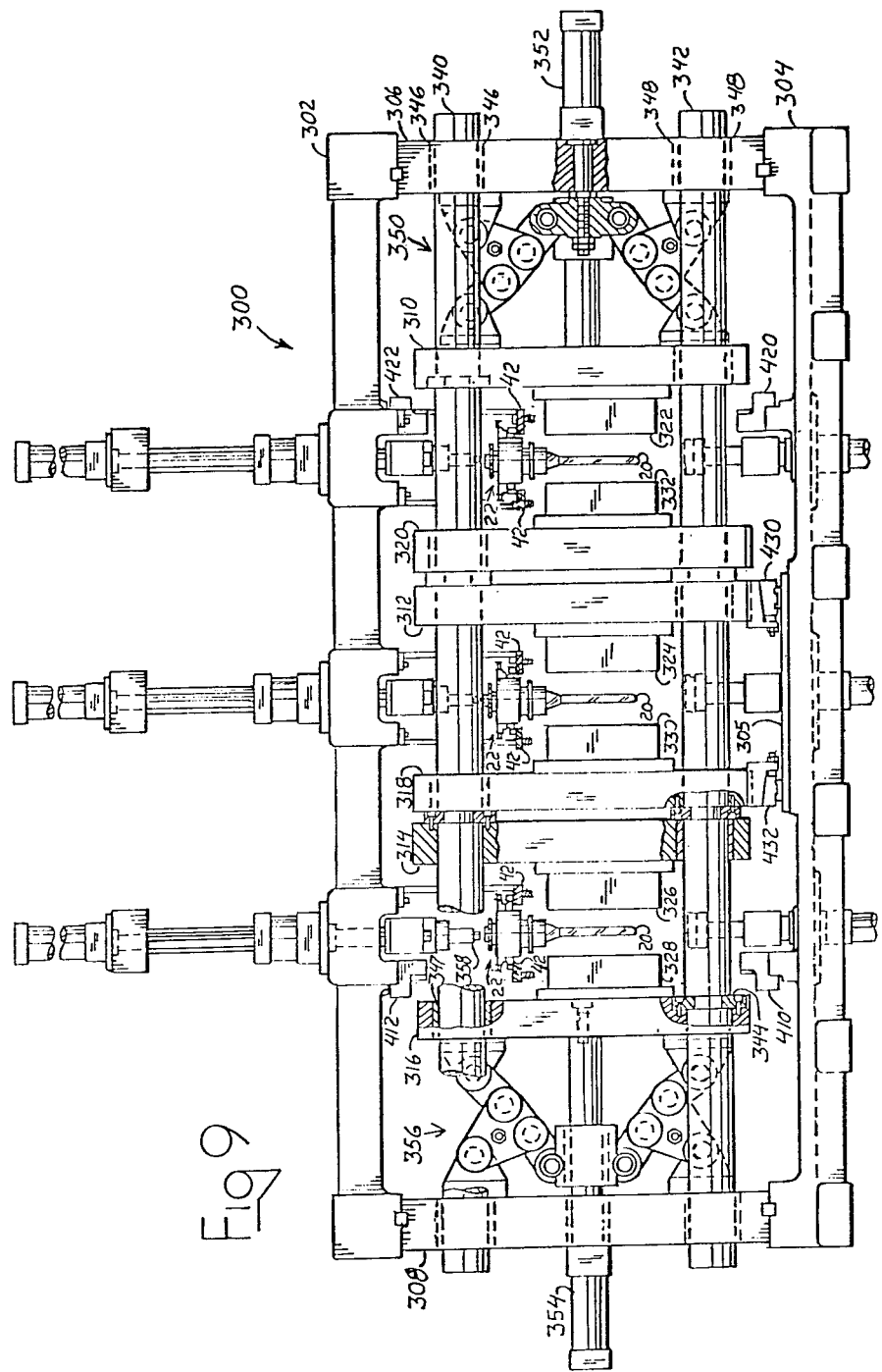
FIG. 9 is a front view of the blow station mold clamps shown in the open position.
Figure 11:
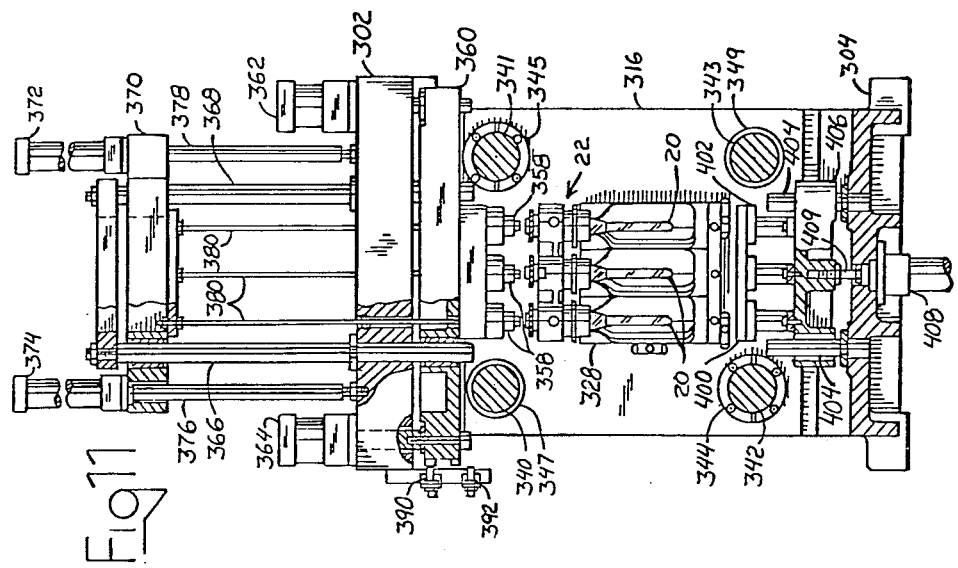
FIG. 11 is a sectional view through the mold station showing the faces of a platen and mold section.
Figure 10:
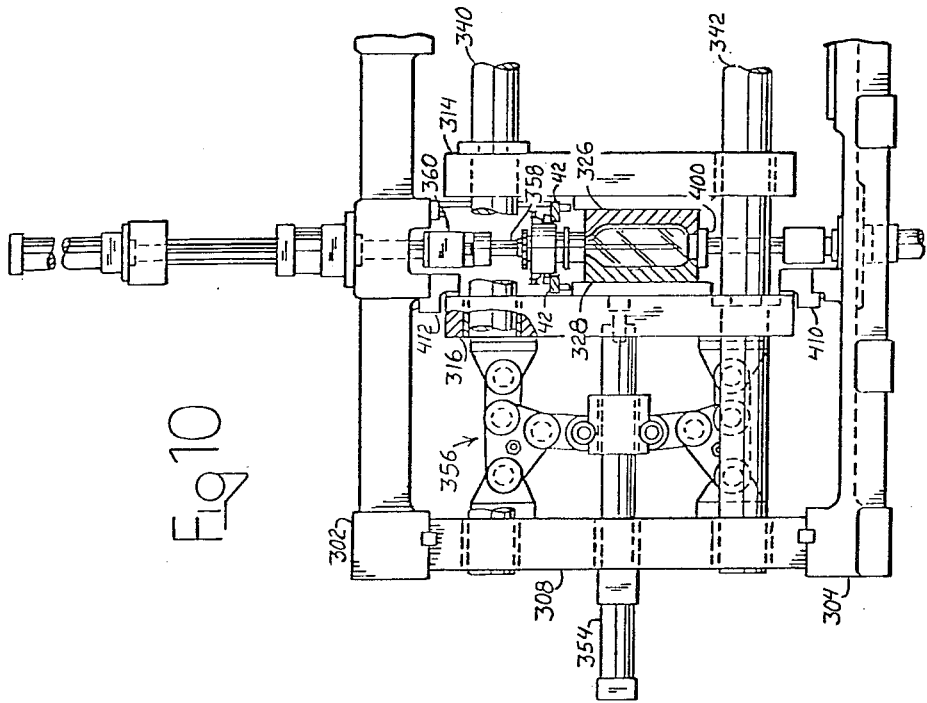
FIG. 10 shows the mold station clamping mechanism in a closed position.

In describing the blow mold mechanism 300 reference shall be made to FIGS. 9, 10 and 11. In FIGS. 9 and 10, details of the blow mold clamp mechanisms are shown; FIG. 9 in particular depicting the clamp in the open position, while FIG. 10 shows the clamp in the closed position. FIG. 11, a partial section through the clamp of the mold cavities, reveals details of the mold together with the overhead blow mechanism for air injection and centering of preforms during expansion.

Referring to FIG. 9, it will be seen that blow mold mechanism 300 consists of a subframe including crown 302, fixed platens 306 and 308 and base member 304. Movable platens 310, 312, 314, 316, 318 and 320 are disposed between fixed platens 306 and 308 along guide rods 340, 342, 341 and 343. Advance and retract motion of these movable platens 310 through 320 is imparted via toggle mechanisms 350 and 356 which are in turn operated by actuators 352 and 354 respectively. The detailed operation of such toggle mechanisms are known to those skilled in the art and will not be further described herein. Operation of the toggle mechanisms is monitored by proximity sensors and actuating buttons located to detect the advanced and retracted positions. Mold sections 322, 324 and 326, and the mating mold sections 328, 330 and 332 are rigidly affixed to movable platens 310, 312, 314, 316, 318 and 320, respectively. These mold sections 322 through 332 define mold cavities which determine the shape of finished bottles 54.

Mold sections 322 through 332 together with their associated movable plates 310 through 320 are intended to operate in pairs associated with the lanes defined by conveyor chains 32. Movable platens 310, 312, and 314 are advanced and retracted in unison by operation of toggle mechanism 350. Likewise, movable platens 316, 318, 320 are advanced and retracted in unison by operation of toggle mechanism 356.

Referring now to FIG. 10, it is seen that movable platens 316 and 314 are in their advanced position so that mold sections 326 and 328 meet at the lane center line. Toggle mechanism 356 is shown in its closed and locked position. Movable platen 316 is shown abutting positive stops 410 and 412. Similarly, movable platen 310 would in this condition be abutting positive stops 420 and 422 of FIG. 9.

By way of describing the cooperation between movable platens and guide rods reference will now be had to FIG. 11. Movable platen 316 is shown to be slidably mounted upon guide rods 340 and 343 by sleeve bearings 347 and 349 respectively. Platen 316 is rigidly attached to guide rods 341 and 342 by locking collars 345 and 344 which are bolted to platen 316. Collars 345 and 344 mate with recessed grooves in guide rods 341 and 342, respectively. Representative grooves are shown in profile in FIG. 9. In a similar fashion, movable platens 318 and 320 are slideably mounted upon guide rods 340 and 343 and rigidly connected to guide rods 341 and 342. Conversely, movable platens 310, 312 and 318 are slidably mounted on guide rods 341 and 342 but rigidly attached to guide rods 340 and 343. By virtue of this rigid attachment of platens 310, 312 and 314 to guide rods 340 and 343, it will be seen that when toggle mechanism 350 is actuated to advance or retract movable platen 310, guide rods 340 and 343 will consequently also advance or retract resulting in an attendant motion of movable platens 312 and 314. Likewise, by virtue of the rigid attachment of movable platen 316 to guide rods 341 and 342, when toggle mechanism 356 is operated to advance or retract movable platen 316, guide rods 341 and 342 will also be set in motion resulting in the attendant motion of movable platens 318 and 320. Thus, mold guide rods 341 and 342 comprise a pair which in turn comprises a set of guide rods. Likewise mold guide rods 340 and 343 also comprise a pair which in turn comprises a second set. Further, mold sections 322 through 326 comprise a set of mold sections slidably supported by one set of guide rods and rigidly connected to a second set of guide rods. Likewise, mating mold sections 328 through 332 comprise a second set of mold sections slidably supported by one set of guide rods and rigidly connected to a second set of guide rods.

It will now be appreciated by those skilled in the art that the combination of platens and guide rods provide a means of simultaneously creating sufficient mold clamping forces for each lane to allow for simultaneously blow molding bottles within the mold cavities defined by each set of mold sections. Also, it can be seen that the lanes, carriers and chucks define a matrix of preforms upon which the blow molding station operates. Further, the columnar loading affecting one guide rod is distributed at each lane so that the effective clamping forces at each lane are the same.

Although some products may be manufactured using two-piece molds, others require three-piece molds. Referring now to FIGS. 10 and 11, a third mold section 400 is shown mounted upon supports 402 which in turn are attached to block 406 which is slidably mounted upon guides 404 and raised or lowered by means of actuator 408 and push rod 409. Similar third mold section apparatus is shown for each line in FIG. 9.

Referring now to FIG. 9, movable platens 312 and 318 are provided with adjustable bearing blocks 430 and 432, respectively. These blocks ride upon base 304 at surface 305 and provide additional support for the platen and guide rod assembly to overcome sag as could otherwise result from a long unsupported span of the guide rod and platen assembly.

In describing the expansion air injection apparatus, reference will now be had to FIGS. 3, 10, and 11. Referring to FIG. 11, carrier 22 with preforms 20 is in position before movable platen 316 for blow molding to produce finished bottles. Air injection nozzles 358 mounted upon advance block 360 are shown in their retracted position. Also shown in retracted position are centering rods 380 attached to center rod advance block 370. When mold sections 328 and 326 are clamped together as shown in FIG. 10, nozzle advance block 360 is lowered to bring nozzles 358 into chucks 208 as shown by the phantom lines of FIG. 3. As seen in FIG. 3, nozzles 358 are provided with resilient seal rings 359 which form a compression seal with chuck 208 when nozzles 358 are advanced. Nozzle advance block 360 is lowered by means of actuators 364 and 362 and the advance position is detected by proximity sensor 392. The spring supports for sections of guideways 42 within the blow mold station limit the forces exerted on rollers 218 when the nozzles 358 are advanced into chucks 208. With nozzles 358 advanced into chucks 208, centering rods 380 may be lowered by means of actuators 372 and 374 in combination with push rods 378 and 376 acting upon block 370 which is guided by rods 368 and 366. Centering rods 380 pass through crown 302 and nozzle advance block 360 and through the center of nozzles 358 into and through the passages of chucks 208. By virtue of the spline configuration of chucks 208 as shown in FIG. 5, the expansion air introduced through nozzles 358 passes around the centering rods 380 and into the preforms to expand the thermally conditioned formable portions thereof within the mold cavities to their finished form. To produce the desired characteristics of the finished bottles, biaxial expansion is required, i.e., the preforms must be expanded longitudinally and radially, and this is accomplished entirely by means of pressurization, the centering rods being advanced for the purpose of maintaining the unexpanded lower end of the formable portion of the preforms on the center line of the mold cavities. Referring to FIG. 10, the center rod is seen at its fully extended position within the finished bottle between mold sections 328 and 326. Once the blow molding has been completed, as indicated by full advancement of centering rods 380, detected by proximity sensors monitoring the position of blocks 370, the centering rods and nozzles 358 can be retracted to their rest positions and movable platens 310 through 320 can be retracted to their open positions. When platens 310 through 320 have been fully retracted, conveyor chains 32 may be indexed to advance the finished bottles towards the eject station and to advanced thermally conditioned preforms into the mold station.

As can now be appreciated, the use of the modular article carriers 22 together with flexible conveying chains 32 allows the functioning of the blowing molding station to proceed even though there are minor misalignments between the carriers and the mold cavity centerlines. This is so since the closure of the molds does not involve the carriers and centering thereof will be effected by advancement of expansion air nozzles into the chucks and by the centering rods as they pass through the chucks and into the preforms during biaxial expansion of the preforms.

Bottle Eject Apparatus

Figure 12:
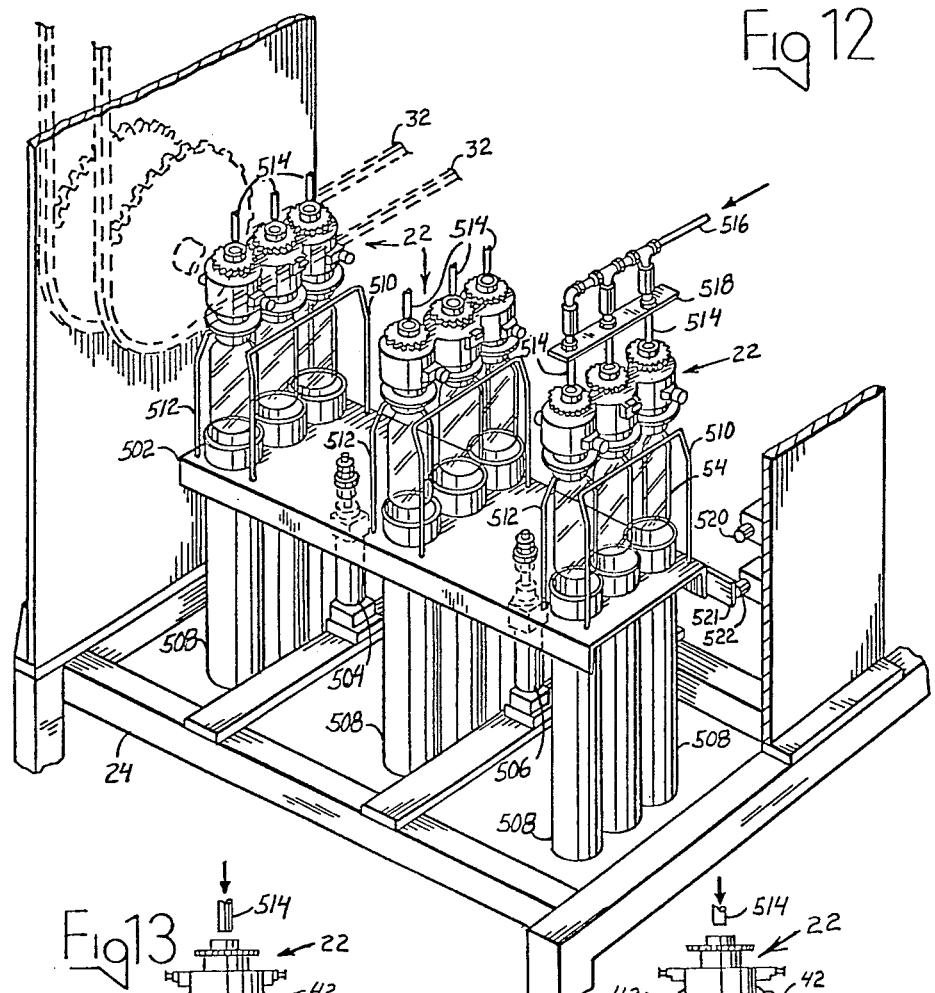
FIG. 12 is an isometric view of the eject station.

Referring to FIG. 12, it is shown that upon completion of a conveyor index, carriers 22 are positioned such that finished bottles 54 are aligned with ejection mechanism 500 to permit release of finished bottles 54 for collection. The conveyor chains 32 and drive sprockets are shown in phantom for a single lane. Also, for clarity, lower guideways 42, which in fact extend into the eject station, are not shown in FIG. 12. Guide tubes 508 and release bars 510 and 512 are attached to eject plate 502. Eject plate 502 is raised or lowered by operation of actuators 504 and 506. Position of eject plate 502 is detected by proximity switches 520 and 522 in cooperation with switch trip bar 521 attached to plate 502. Positive ejection pressure is supplied through line 516 to eject ports 514 mounted in support bracket 518.

Figure 13:
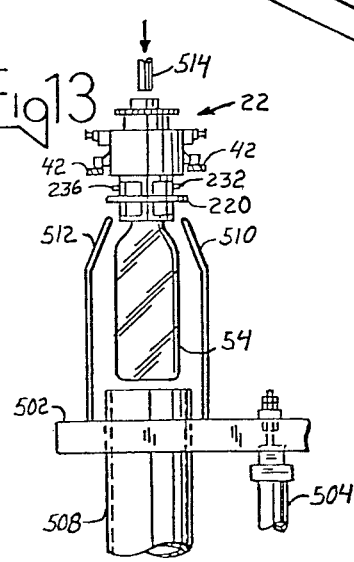
FIG. 13 is an end view of one portion of the eject station prior to ejection.
Figure 14:
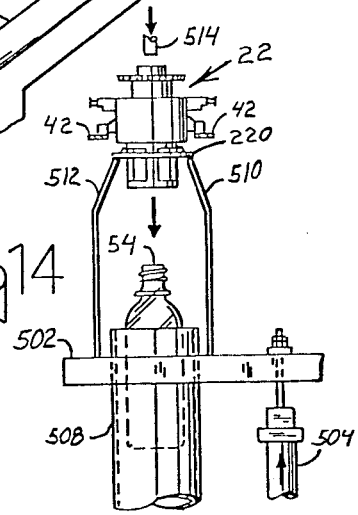
FIG. 14 is an end view of a portion of the eject station showing ejection.

Referring now to FIG. 13, eject plate 502 is shown in the rest or low position as would be detected by proximity switch 522. As can be seen release ring actuating bars 510 and 512 are formed so that upon advance of eject plate 502 these bars will contact release rings 220. In this manner, release rings of all three chucks 208 of carrier 22 will be advanced to the release position causing rotation of levers 236 and 232 shown in FIGS. 3 and 4 to permit release of bottles 54. FIG. 14 shows eject plate 502 and release bars 510 and 512 in the advanced position which is detected by proximity sensor 520, and shows finished bottle 54 dropping through guide tube 508. Positive eject pressurized air is provided through nozzles 514 to overcome forces of adhesion between finished bottle 54 and resilient seal 260 shown in FIGS. 3 and 4. Before the next conveyor index can be initiated, release plate 502 must be returned to its rest or lower position. This will be detected as absence of proximity swtich trip bar 521 from detector 520 and presence of bar 521 at the detector 522.

Machine Cycle of Operation

It will now be appreciated by those skilled in the art that the production of finished bottles from preforms is accomplished in a repeating cycle. Preforms are loaded into empty carriers at the load station, thermally conditioned within the oven section, expanded into bottles at the blow mold station and finally released for collection at the eject station. With each index of the conveyor chains, the functions of each operating station mechanism are repeated according to the sequences of operation previously described.

Applicants have chosen to control these cyclic operations by means of a general purpose programmable controller 9 shown in FIG. 1 manufactured by the assignee of the prsent invention. It is to be understood that other controls could be used provided that they are capable of: (1) interfacing with sensing devices such as the proximity sensors previously described, (2) performing logical functions in response to inputs received, and (3) effecting energization of hydraulic and pneumatic actuators used on the various operating station mechanisms in response to the logical functions performed, for example by energizing solenoids and relays. The control is required to effect the execution of the operating sequences of each operating station mechanism and upon completion thereof to energize the conveyor drive mechanism. When the conveyor chain has completed a full index the control will again initiate execution of the operating station functions and deenergize the conveyor drive once it has completed its cycle.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations, and equivalents falling within the spirit and scope of the appended claims.

What is claimed is:
1. An apparatus for high rate production of biaxially oriented articles from thermoplastic article preforms, each article preform having a formable portion and a neck portion, the formable portion being biaxially expanded when its temperature is at a near the molecular orientation temperature of the thermoplastic, the apparatus comprising:
  (a) a machine frame;
  (b) preform carriers suspended from the machine frame, each carrier releasably retaining at least one preform, and each carrier having a passage therethrough to admit an expansion fluid into the preform;
  (c) a blow molding apparatus rigidly attached to the machine frame for biaxially expanding the article preforms comprising
    (1) a blow station frame comprising
      (a) a base mounted on the machine frame
      (b) fixed side plates attached to opposite ends of the base, and
      (c) a crown mounted on top of the side plates and lying parallel with base,
    (2) a plurality of mold guide rods passing through the side plates and slidably supported thereby, the guide rods being operatively associated in pairs comprising first and second sets thereof,
    (3) a first set of mold sections rigidly connected to and disposed along the first set of guide rods between the side plates and slidably supported upon the second set of guide rods,
    (4) a second set of mold sections consisting of mating mold sections for the first set of mold sections, the first and second mold sections defining mold cavities, and the second set of mold sections being rigidly connected to and disposed along the second set of guide rods between the side plates and slidably supported on the first set of guide rods.

(5) first and second hydraulic actuators for respectively imparting motion to the first and second sets of guide rods, each actuator being respectively connected between a side plate and a mold section of the first and second sets of mold sections, the imparted motion closing mating mold sections together to surround preforms and opening mating mold sections to permit passage of expanded articles therebetween, and (6) mold pressurizing means supported by the crown and disposed thereupon to introduce a pressurized expansion fluid into the preforms through the passage while the preforms are positioned within the mold cavities.

2. The apparatus of claim 1 wherein the carriers are flexibly suspended from the machine frame and the mold pressurizing means further comprises preform centering rods for maintaining the preforms on the mold cavity centerlines during expansion of the preforms, the preform centering rods passing through the crown, the passages, and into the mold cavities.

3. The apparatus of claim 2 wherein each carrier retains a plurality of preforms, the plurality of carriers and plurality of preforms defining a matrix of preforms to be simultaneously expanded by the blow molding apparatus.

4. The apparatus of claim 1 wherein the mold pressuzing means further comprises pressurized expansion fluid injection nozzles movably supported upon the crown, for introducing the expansion fluid into the passage, the nozzles being reciprocated between a rest position displaced from the carriers and a pressurizing position at which they contact the carriers.

5. The apparatus of claim 4 wherein the fluid injection nozzles further comprise resilient seals for forming compression seals with the carriers sufficient to contain the forces of expansion.

* * * * *